US006989868B2

(12) United States Patent
Masukura et al.

(10) Patent No.: US 6,989,868 B2
(45) Date of Patent: Jan. 24, 2006

(54) METHOD OF CONVERTING FORMAT OF ENCODED VIDEO DATA AND APPARATUS THEREFOR

(75) Inventors: Koichi Masukura, Kawasaki (JP); Noboru Yamaguchi, Yashio (JP); Toshimitsu Kaneko, Kawasaki (JP); Tomoya Kodama, Kawasaki (JP); Takeshi Mita, Yokohama (JP); Tadaaki Masuda, Tokyo (JP); Wataru Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 573 days.

(21) Appl. No.: 10/179,985

(22) Filed: Jun. 26, 2002

(65) Prior Publication Data

US 2003/0001964 A1 Jan. 2, 2003

(30) Foreign Application Priority Data

Jun. 29, 2001 (JP) ............................ 2001-200157
Mar. 26, 2002 (JP) ............................ 2002-084928

(51) Int. Cl.
*H04N 7/01* (2006.01)

(52) U.S. Cl. ............ 348/441; 375/240.02; 375/240.08

(58) Field of Classification Search ................ 348/441, 348/473, 469, 470; 375/240.02, 240.08, 375/240.26, 240.03; 358/426.01, 426.02, 358/426.08, 426.12

See application file for complete search history.

(56) References Cited

U.S. PATENT DOCUMENTS 6,574,279 B1 * 6/2003 Vetro et al. ............ 375/240.08
6,625,211 B1 * 9/2003 Etoh et al. ............. 375/240.03
6,671,322 B2 * 12/2003 Vetro et al. ............ 375/240.16
2001/0010706 A1 * 8/2001 Sato et al. ............. 375/240.12
2002/0015444 A1 * 2/2002 Suzuki et al. .......... 375/240.02
2002/0021669 A1 * 2/2002 Kunito et al. ............... 370/235
2002/0157112 A1 * 10/2002 Kuhn ......................... 725/113
2004/0218671 A1 * 11/2004 Haraguchi et al. ..... 375/240.12

FOREIGN PATENT DOCUMENTS

JP 8-186821 7/1996

* cited by examiner

*Primary Examiner*—Victor R. Kostak

(74) *Attorney, Agent, or Firm*—Oblon, Spivak, McClelland, Maier & Neustadt, P.C.

(57) ABSTRACT

A format conversion method comprising decoding the bit stream of a first encoded video data format, converting decoded video data to the second encoded video data format, encoding the converted video data in a process for converting the bit stream of the first encoded video data format to the bit stream of the second encoded video data format, and controlling processing parameters of at least one of the decoding, the converting and the encoding.

11 Claims, 10 Drawing Sheets

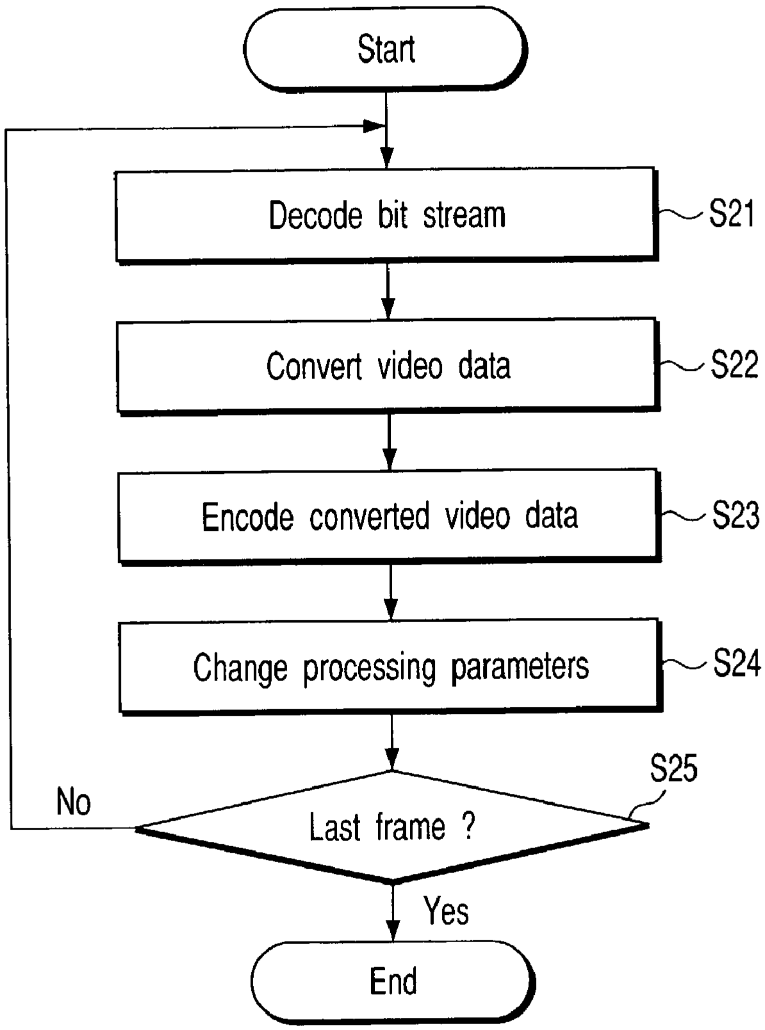
F I G. 2
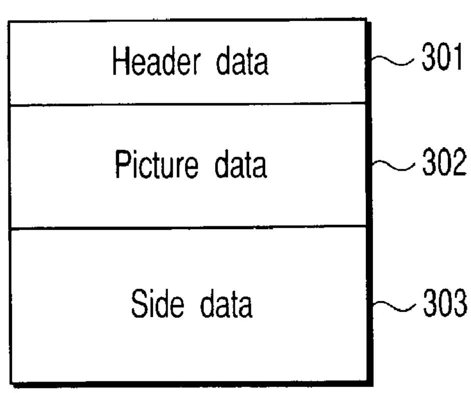
F I G. 3

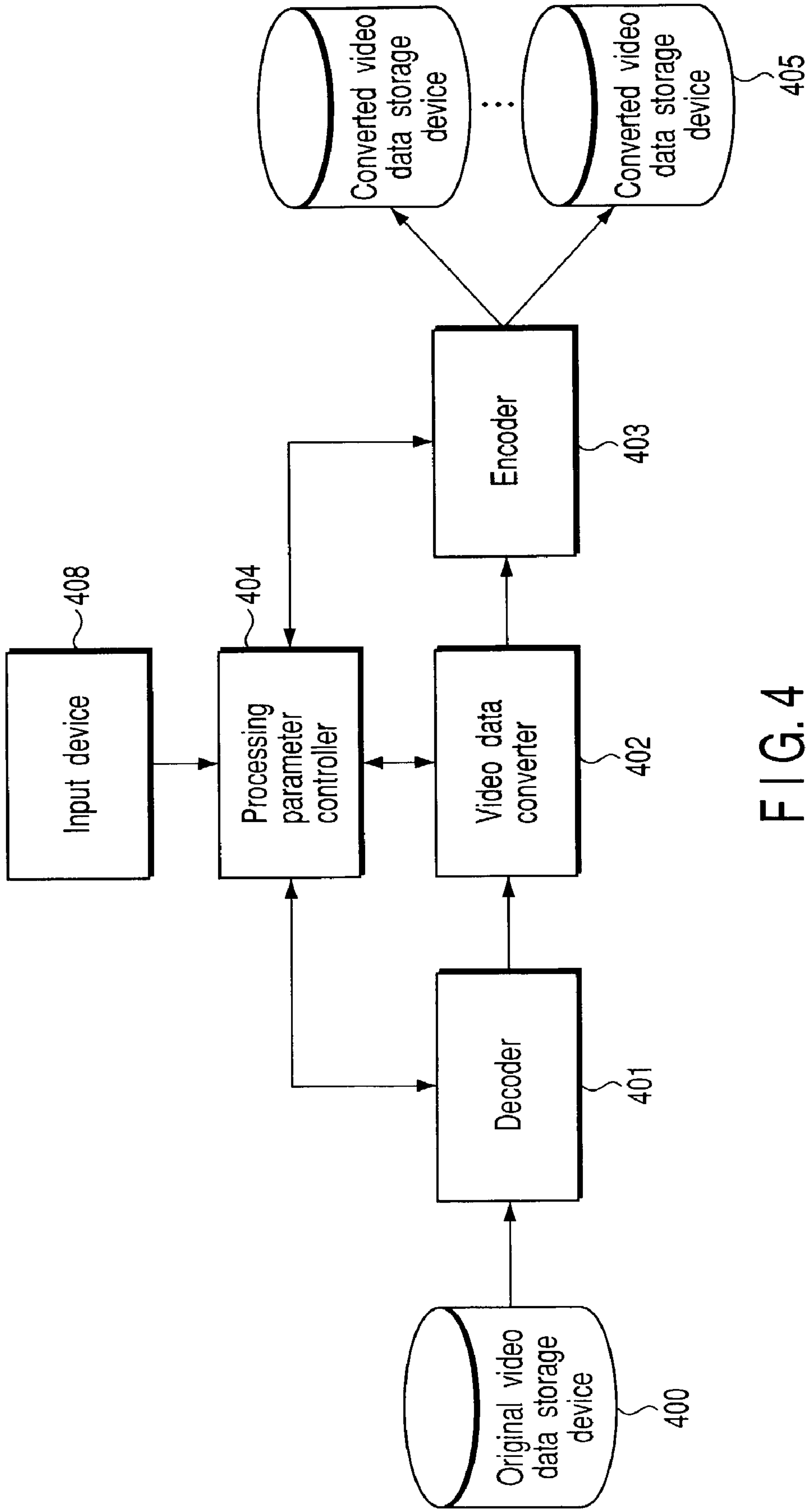
F I G. 4

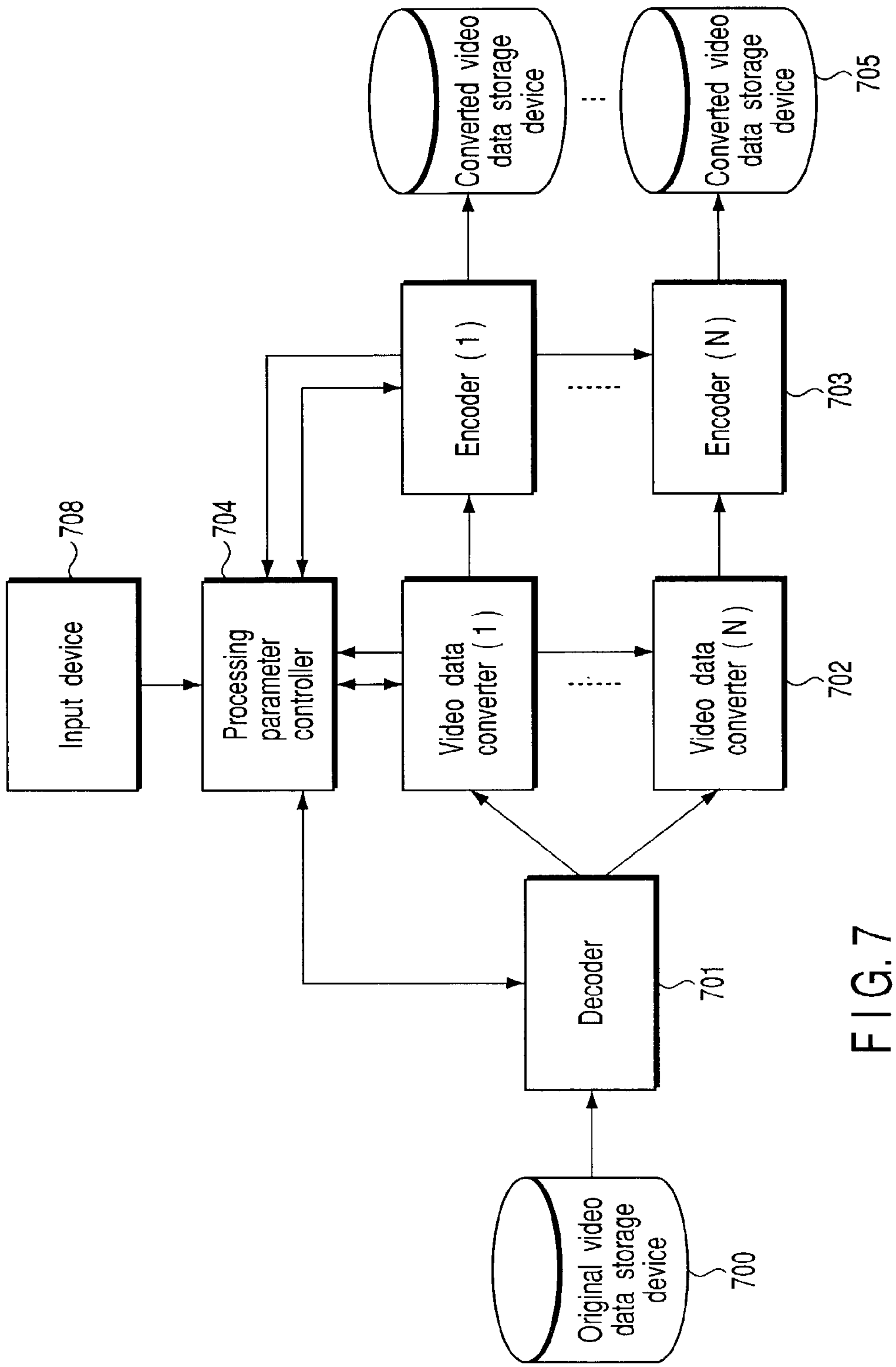
F I G. 7

METHOD OF CONVERTING FORMAT OF ENCODED VIDEO DATA AND APPARATUS THEREFOR

CROSS-REFERENCE TO RELATED APPLICATIONS

This application is based upon and claims the benefit of priority from the prior Japanese Patent Applications No. 2001-200157, filed Jun. 29, 2001; and No. 2002-084928, filed Mar. 26, 2002, the entire contents of both of which are incorporated herein by reference.

BACKGROUND OF THE INVENTION

1. Field of the Invention

The present invention relates to a method of converting the format of encoded video data and an apparatus therefor, which convert a bit stream of a given encoded video data format into a bit stream of another encoded video data format.

2. Description of the Related Art

With rapid advances in video processing techniques, it has become common to, for example, distribute, view, save, and edit moving picture (video) data as digital data. Recently, services which allow users to view digital videos with portable terminals are being put into practice as well as handling digital videos by using video equipment and computers.

With regard to video transceiving methods, video data are exchanged through various media such as cable TVs, the Internet, and mobile telephones in addition to ground-based broadcasting and satellite broadcasting. Various-video encoding schemes have been proposed in accordance with the application purposes of videos and video transfer methods.

As video encoding schemes, for example, MPEG1, MPEG2, and MPEG4, which are international standard schemes, have been used. These video encoding schemes differ in their picture sizes and bit rates suitable for their data formats (encoded video data formats). For this reason, in using videos, encoded video data formats complying with video encoding schemes suitable for the purses and transfer methods must be selected.

As handling of videos as digital data has become common practice, demands have arisen for using a video stored in a given encoded video data format with a medium or application purpose different from the original medium or application purpose. When, for example, the bit stream of encoded video data stored in a data format based on MPEG2 is to be used with a portable terminal, the MPEG2 encoded video data must be converted into a bit stream in another encoded video data format, e.g., an encoded video data format based on MPEG4, upon changing encoding parameters such as the encoding scheme, picture size, frame rate, and bit rate because of the limitations imposed on display equipment and associated with channel speed.

As a technique of format-converting (transcoding) a bit stream between different video encoding schemes, a format conversion technique based on re-encoding is known, which decodes a bit stream as a conversion source first, and then encoding the decoded data in accordance with an encoded video data format as a conversion destination.

In the above format conversion technique for encoded video data, which is based on the conventional re-encoding scheme, encoding parameters for the conversion destination must be determined before format conversion. For this reason, the parameters cannot be changed in accordance with the situation during processing. It is therefore difficult to estimate the overall processing quantity. In order to perform format conversion simultaneously with viewing of an original video or converted video or perform format conversion in accordance with the transmission speed in streaming transmission, the user must determine appropriate encoding parameter by trial and error. In addition, since the picture quality of a video generated by format conversion cannot be known until the end of processing, if the picture quality is insufficient, conversion processing must be redone from the beginning.

In addition, the conventional format conversion technique for encoded video data allows only conversion of the entire interval of a given series of videos into another series of videos. When, therefore, a bit stream in a given encoded video data format is converted into bit streams in a plurality of encoded video data formats in order to simultaneously transmit the bit streams from many media, decoding, video data conversion, and encoding must be performed a plurality of times in accordance with the plurality of encoded video data formats as conversion destinations. This processing takes much time.

Furthermore, there are many demands for a technique of generating a digest by extracting only desired portions from a plurality of videos and performing format conversion and a technique of performing format conversion upon erasing unnecessary portions. In order to realize such techniques by the conventional format conversion methods, editing such as partial extraction and partial erasure must be independently performed before or after format conversion, resulting in poor efficiency.

It is an object of the present invention to provide a method of converting the format of encoded video data and an apparatus therefor, which can automatically change processing parameters at the time of format conversion.

BRIEF SUMMARY OF THE INVENTION

According to an aspect of the present invention, there is provided a format conversion method for converting a bit stream of a first encoded video data format to a bit stream of a second encoded video data format, the method comprising: decoding the bit stream of the first encoded video data format to generate video data; converting the video data to the second encoded video data format to generate converted video data; encoding the converted video data in a process for converting the bit stream of the first encoded video data format to the bit stream of the second encoded video data format, to generate the bit stream of the second encoded video data format; and controlling processing parameters of at least one of the decoding, the converting and the encoding.

According to another aspect of the present invention, there is provided a format conversion method for converting a bit stream of a first encoded video data format to a bit stream of a second encoded video data format, the method comprising: decoding the bit stream of the first encoded video data format to generate video data; converting the video data to a format suitable for the second encoded video data format to generate converted video data; encoding the converted video data to generate the bit stream of the second encoded video data format; and controlling processing parameters of at least one of the decoding, the converting and the encoding in a process of converting the first encoded video data format to the second encoded video data format, using meta data accompanying the bit stream of the first encoded-video data format.

According to another aspect of the present invention, there is provided a format conversion apparatus which converts a bit stream of a first encoded video data format to a bit stream of a second encoded video data format, the apparatus comprising: a decoder which decodes the bit stream of the first encoded video data format to output video data according to its processing parameters; a converter which converts the video data to the second encoded video data format to output converted video data its processing parameters; an encoder which encodes the converted video data to output the bit stream of the second encoded video data format according to its processing parameters; and a controller which controls the processing parameters of at least one of the decoder, the converter and the encoder in converting the video data.

According to another aspect of the present invention, there is provided a format conversion apparatus which converts a bit stream of a first encoded video data format to a bit stream of a second encoded video data format, the apparatus comprising: a decoder which decodes the bit stream of the first encoded video data format and output video data; a controller which controls a time position and a decoding order of parts of the bit streams to be decoded by the decoder in accordance with designation of a user or meta data added to the first video coded data; a converter which converts the video data to the second encoded video data format and outputs converted video data; and an encoder which encodes the converted video data and outputs the bit stream of the second encoded video data format.

According to another aspect of the present invention, there is provided a format conversion program recorded on a computer readable medium and making a computer convert a bit stream of a first encoded video data format to a bit stream of a second encoded video data format, the program comprising: means for instructing the computer to decode the bit stream of the first encoded video data format to generate video data; means for instructing the computer to convert the video data to a format suitable for the second encoded video data format to generate converted video data; means for instructing the computer to encode the converted video data to generate the bit stream of the second encoded video data format; means for instructing the computer to convert the bit stream of the first encoded video data format to the bit stream of the second encoded video data format; and means for instructing the computer to control processing parameters of at least one of decoding, converting and encoding.

BRIEF DESCRIPTION OF THE SEVERAL VIEWS OF THE DRAWING

FIG. 2 is a flow chart showing a procedure in the first embodiment;

FIG. 3 is a view showing an example of the data structure of video data in the first embodiment;

FIG. 4 is a block diagram showing the arrangement of an apparatus for converting the format of encoded video data according to the second embodiment of the present invention;

FIG. 7 is a block diagram showing the arrangement of an apparatus for converting the format of encoded video data according to the third embodiment of the present invention;

DETAILED DESCRIPTION OF THE INVENTION

The embodiments of the present invention will be described below with reference to the views of the accompanying drawing.

(First Embodiment)

Figure 1:
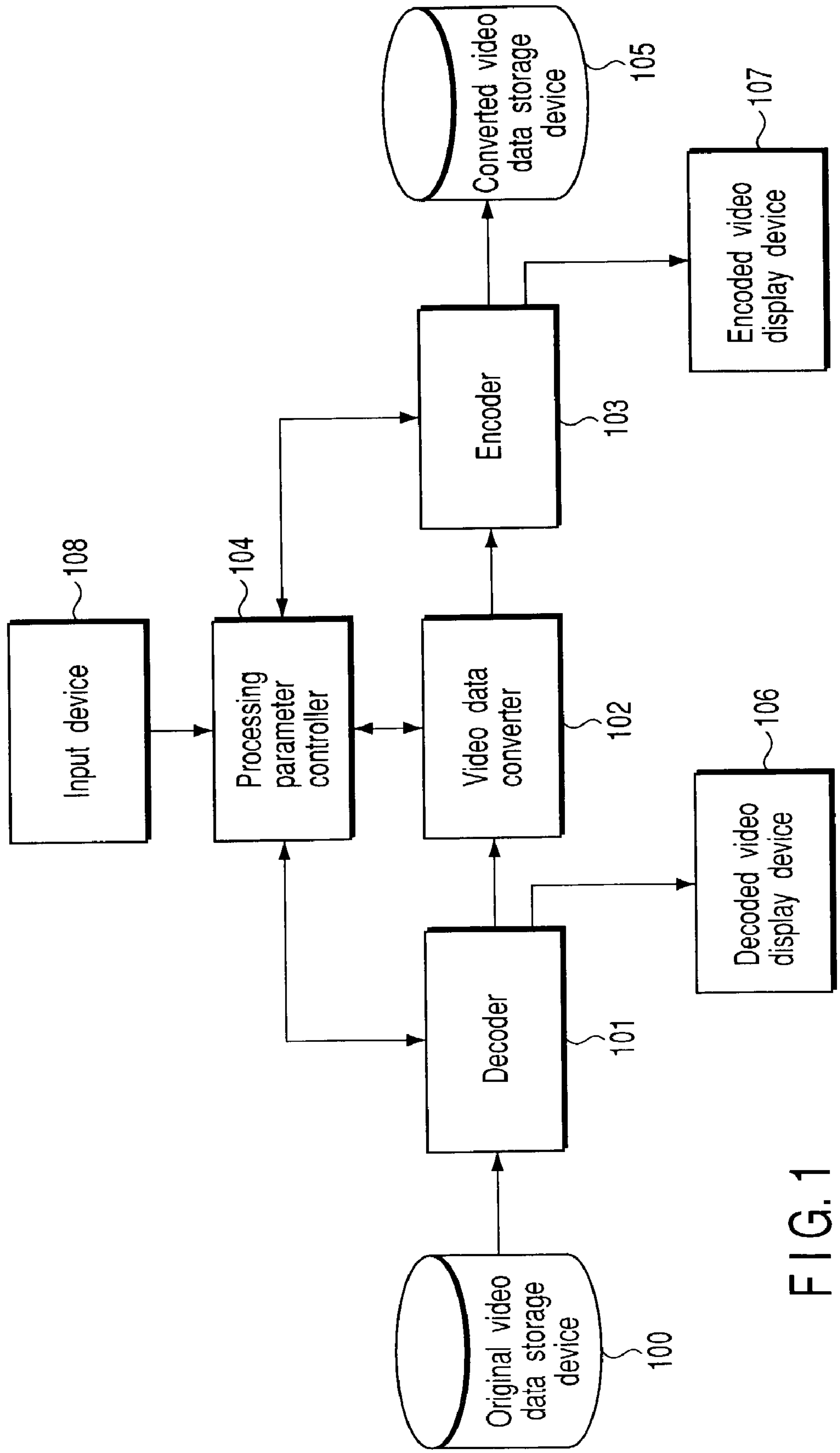
FIG. 1 is a block diagram showing the arrangement of an apparatus for converting the format of encoded video data according to the first embodiment of the present invention.

FIG. 1 shows the arrangement of a format conversion apparatus (transcoder) for encoded video data according to the first embodiment of the present invention.

This format conversion apparatus is an apparatus for performing format conversion from, for example, a bit stream in the first encoded video data format such as MPEG2 to a bit stream in the second encoded video data format such as MPEG4. The format conversion apparatus is constructed by an original video data storage device 100, decoder 101, video data converter 102, encoder 103, processing parameter controller 104, converted video data storage device 105, decoded video display device 106, encoded video display device 107, and input device 108.

The decoded video display device 106 and encoded video display device 107 are not essential parts and are required only when a decoded or encoded video is to be displayed. The original video data storage device 100 and converted video data storage device 105 may be formed from different storage devices or a single storage device.

The original video data storage device 100 is formed from, for example, a hard disk, optical disk, or semiconductor memory, and stores the encoded data of an original video, i.e., data (bit stream) in the first encoded video data format.

The decoder 101 is, for example, an MPEG2 decoder, which reads out a bit stream in MPEG2, which is the first encoded video data format, from the original video data storage device 100, decodes it, and outputs the format conversion video data to the video data converter 102. The format conversion video data is constructed by picture data and side data such as a motion vector.

The picture size in format conversion video data (picture data size in format conversion video data) is generally equal to the picture size of the original video, but may differ from it. In addition, only an important DC component of the picture data in the format conversion video data may be output. The side data in the format conversion video data may also be output after the data quantity is reduced by skipping. These control operations are performed on the basis of control data from the processing parameter controller 104.

In this embodiment, the decoder 101 is configured to simultaneously output decoded video data to allow the user to view the original video in addition to the format conversion video data. The decoded video data is supplied to the decoded video display device 106 formed from a CRT display or liquid crystal display and played back/displayed.

The video data converter 102 converts the format conversion video data input from the decoder 101 into video data suitable for the second encoded video data format, and outputs it to the encoder 103. More specifically, the video data converter 102 outputs only the video data of necessary and sufficient frames to the encoder 103 in accordance with the frame rate of a bit stream in the second encoded video data format. The frame rate of the video data output from the video data converter 102 may be a constant frame rate or variable frame rate. In the case of a constant frame rate, the frame rate is controlled on the basis of control data from the processing parameter controller 104.

The encoder 103 is, for example, an MPEG4 encoder, which encodes the video data input from the video data converter 102 to output a bit stream in MPEG4, which is the second encoded video data format. Encoding parameters such as a bit rate at the time of encoding are controlled on the basis of control data from the processing parameter controller 104. The bit stream in the second encoded video data format is stored as converted video data in the converted video data storage device 105.

In addition, in this embodiment, the encoder 103 simultaneously outputs encoded video data to allow the user to view an encoded preview, in addition to the bit stream in the second encoded video data format. The encoded video data is video data generated by local decoding performed in an encoding process. This data is supplied to the encoded video display device 107 formed from a CRT display or liquid crystal display and displayed as a video. Note that the decoded video display device 106 and encoded video display device 107 may be different displays or a single display.

The processing parameter controller 104 controls the processing parameters in at least one of the following sections: the decoder 101, video data converter 102, and encoder 103. More specifically, upon reception of an instruction to change processing parameters from the user, which is input through the input device 108 such as a keyboard before or during the processing done by these devices 101 to 103, the processing parameter controller 104 outputs control data to change the processing parameters in the decoder 101, video data converter 102, and encoder 103 in accordance with the instruction.

Instead of or in addition to outputting control data in accordance with the instruction input from the user, the processing parameter controller 104 may monitor the processing quantity (processing speed) of at least one of the following sections: the decoder 101, video data converter 102, and encoder 103 and output control data to change the processing parameters on the basis of the monitoring result.

More specifically, for example, the processing parameter controller 104 uses time data called a time stamp which is contained in the encoded video data of an MPEG bit stream, and compares the time stamp of actual time data with that of processing data. If the processing data is delayed from the actual data, the processing parameter controller 104 determines that the processing quantity is excessively large (the processing speed is low). In accordance with this result, the processing parameter controller 104 controls to reduce the processing quantity of at least one of the following sections: the decoder 101, video data converter 102, and encoder 103. This makes it possible to perform format conversion in real time.

Methods of increasing/decreasing the processing quantities in the decoder 101, video data converter 102, and encoder 103 will be described below.

The processing quantity in the decoder 101 can be increased/decreased by changing the number of frames for which decoding is skipped. When the processing quantity is to be decreased, video data is generated by decoding frames at intervals of several frames instead of all frames or decoding only I pictures. When the decoded video display device 106 displays a decoded video to allow the user to view the original video, the processing quantity in the decoder 101 can also be increased/decreased by increasing/decreasing the number of frames of the decoded video to be displayed.

The processing quantity in the video data converter 102 or encoder 103 can be increased/decreased by, for example, increasing/decreasing the frame rate of video data, increasing/decreasing the number of I pictures, changing encoding parameters such as a bit rate, or changing post filter processing. When the encoded video display device 107 displays an encoded video to allow the user to view an encoded preview, the pattern page can be increased/decreased by increasing/decreasing the number of frames of an encoded video to be displayed.

In stream transmission of a bit stream in the second encoded video data format output from the encoder 103, the processing parameter controller 104 may output control data on the basis of information associated with a transmission channel through which the bit stream in the second encoded video data format is transmitted, e.g., a transmission speed and packet loss rate (these pieces of information will be generically referred to as channel information hereinafter). At the time of transmission of a bit stream, the transmitting side on which the format conversion apparatus according to this embodiment is installed can receive channel data through the RTCP (Real Time Control Protocol). The RTP/PTCP is described in detail in, for example, reference 1: Hiroshi Hujiwara and Sakae Okubo, "Picture Compression Techniques in Internet Age", ASCII, pp. 154–155.

The processing parameter controller 104 obtains a transmission delay from this channel data. Upon determining that the transmission delay has increased, the processing parameter controller 104 performs processing, e.g., decreasing the bit rate or frame rate of a bit stream in the second encoded video data format at the time of transmission. Upon determining on the basis of the channel data that the packet loss rate has increased, the processing parameter controller 104 performs error resilience processing, e.g., increasing the frequency of periodic refresh operation performed by the encoder 103 or decreasing the size of video packets constituting a bit stream. Error resilience processing such as period refresh operation in MPEG4 is described in detailed in reference 2: Miki, "All about MPEG-4", 3-1-5 "error resilience", Kogyo Tyosa Kai, 1998.

In addition, when some kind of meta data representing the contents of a video is added to a bit stream in the first encoded video data format in advance, the processing parameter controller 104 may change the processing parameters of the video data converter 102 or encoder 103 by using the meta data.

Meta data may take any format, e.g., a unique format or a meta data format complying with a domestic standard like MPEG-7. Assume that the meta data contains information indicating breaks between scenes and the degrees of importance of the respective scenes. In this case, the quality of a bit stream in the second encoded video data format can be improved in a scene with a high degree of importance by increasing the processing quantity of the encoder 103. In contrast to this, in a scene with a low degree of importance, the speed of format conversion can be increased by decreasing the processing quantity of the encoder 103.

The bit stream in the second encoded video data format which has undergone such format conversion is stored in the converted video data storage device 105. Like the original video data storage device 100, the converted video data storage device 105 is formed from a hard disk, optical disk, semiconductor memory, or the like.

As described above, streaming transmission of a bit stream in the second encoded video data format may be done through the converted video data storage device 105, or the bit stream output from the encoder 103 may be directly sent out to a transmission channel.

Part or all of the processing performed by the format conversion apparatus for encoded video data according to this embodiment can be implemented as software processing by a computer. An example of a procedure in this embodiment will be described below with reference to the flow chart of FIG. 2.

In this embodiment, processing is done frame by frame. First of all, a given 1-frame bit stream in the first encoded video data format is decoded (step S21). Format conversion video data is generated by this decoding. If it is required to view the original video, decoded video data is generated simultaneously with the generation of the format conversion video data. The format conversion video data obtained in decoding step S21 is converted into video data in a format suitable for the second encoded video data format (step S22). The video data obtained in video data conversion step S22 is encoded to generate a bit stream in the second encoded video data format (step S23).

If frame skipping is done in decoding step S21 or video data conversion step S22, there is no subsequent processing. If it is required to view an encoded preview, encoded video data is output concurrently with encoding.

Every time decoding, video data conversion processing, and encoding in steps S21, S22, and S23 are completed by one frame or a plurality of frames, the processing parameters in steps S21 to S23 are changed in accordance with an instruction from the user, monitoring results on processing quantities (processing speeds), or channel information (transmission speed, packet loss rate, and the like) (step S24), as described above. The above processing is performed until it is determined in step S25 that the frame to be processed is the last frame. When the last frame is completely processed, the series of operations is terminated.

FIG. 3 schematically shows an example of the data structure of format conversion video data in this embodiment. According to this data structure, one frame contains header data 301, picture data 302, and side data 303. Assume that MPEG (MPEG2 or MPEG4) is used. First of all, the header data 301 is data representing the frame number and time stamp of the frame, a picture type (frame type and prediction mode) such as an I picture or P picture, and the like. The side data 303 is data other than picture data, e.g., motion vector data in the case of motion compensation.

Picture data is generally generated for each frame. However, frames to be output may be skipped. When, for example, original video data with 30 frames/sec is to be format-converted into converted video data with 10 frames/sec, it suffices if picture data of one or more frames are output per 3 frames. Alternatively, only I pictures or only I and P pictures may be output.

When a bit stream in the first encoded video data format is to be format-converted to comply with the required encoded format, i.e., the second encoded video data format, the picture data 302 of the video data obtained by decoding the bit stream in the first encoded video data format is enlarged or reduced in accordance with the picture size of the converted video data which is the bit stream in the second encoded video data format. Likewise, of the side data 303, data associated with a parameter that differs between the original video data and the converted video data, e.g., picture size, is converted in accordance with the format of the converted video data. For example, the motion vector data is remade in accordance with the picture size of the converted video data.

As described above, according to this embodiment, during conversion of a bit stream in the first encoded video data format into a bit stream in the second encoded video data format, the processing parameters are controlled in accordance with an instruction from the user, processing quantity monitoring results, information associated with a transmission channel through which the bit stream in the second encoded video data format is transmitted, and the like. This allows the user to perform format conversion while viewing a decoded video as an original video or an encoded video as a video after format conversion or perform streaming transmission of a bit stream while performing format conversion.

More specifically, when the user wants to change the encoded video data format of an original video while viewing it, conversion processing is controlled in accordance with the playback speed of the original video. This makes it possible to prevent the display of the original video from being delayed with respect to the converted video. This also allows the user to properly set conversion parameters while sequentially checking the picture quality of the converted video. In addition, when performing streaming transmission during format conversion, the original video can be automatically converted into a video suitable for the transmission speed. Even if, therefore, the transmission speed changes during transmission, no video delay occurs.

(Second Embodiment)

A format conversion method of converting a bit stream in one first encoded video data format into bit streams in a plurality of second encoded video data formats will be described next as the second embodiment of the present invention. The plurality of second encoded video data formats are encoded video data formats that differ in the encoding methods or encoding parameters such as picture size and frame rate.

FIG. 4 is a block diagram showing the arrangement of a format conversion apparatus for encoded video data according to this embodiment. An original video data storage device 400, decoder 401, and input device 408 are basically the same as those in the first embodiment.

In this embodiment, a video data converter 402 is configured to convert conversion video data from the decoder 401 into a format suitable for a plurality of second encoded video data formats. An encoder 403 is configured to generate bit streams in the plurality of second encoded video data formats by encoding the conversion video data from the video data converter 402. In addition, converted video data storage devices 405 equal in number to the second encoded video data formats into which the first encoded video data format is to be converted are prepared.

A processing parameter controller 404 has the same function as that in the first embodiment, but controls the processing parameters for each video data contained in the video data in a plurality of formats because the video data converter 402 and encoder 403 process the video data in the plurality of formats.

Figure 5:
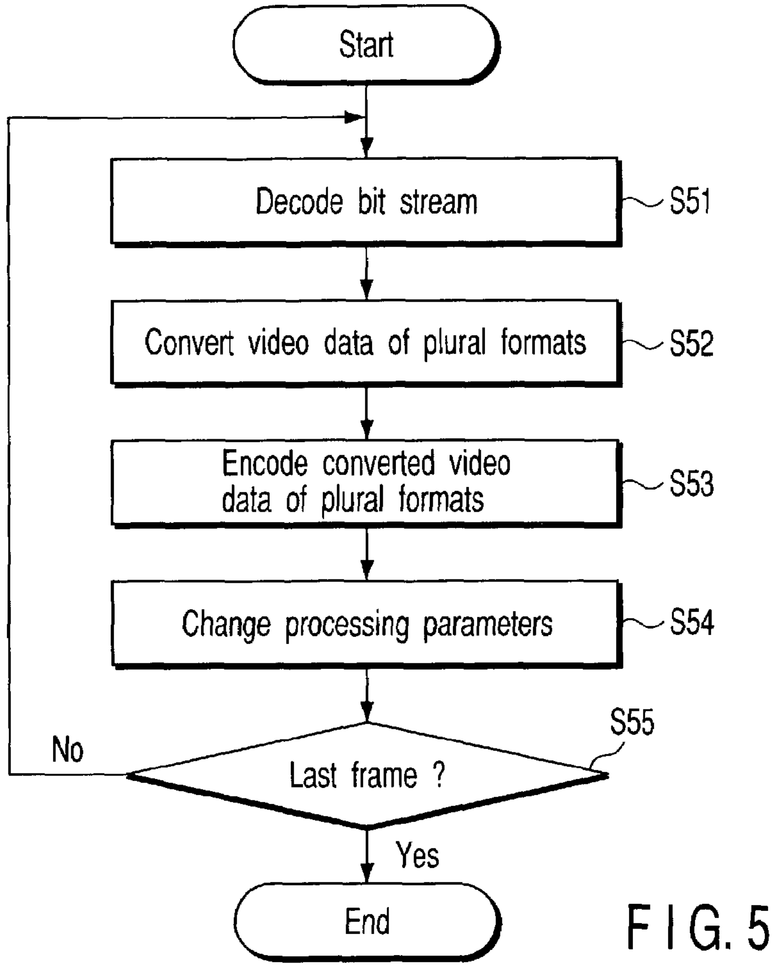
FIG. 5 is a flow chart showing a procedure in the second embodiment.

An example of a procedure in this embodiment will be described next with reference to the flow chart of FIG. 5.

In this embodiment, processing is done on a frame basis as in the first embodiment. That is, first of all, a 1-frame bit stream in the first encoded video data format is decoded (step S51). Format conversion video data is generated by this decoding. If it is required to view the original video, decoded video data is generated simultaneously with the generation of the format conversion video data. The format conversion video data obtained in decoding step S51 is converted into video data in a plurality of formats suitable for a plurality of second encoded video data formats (step S52)

Figure 6:
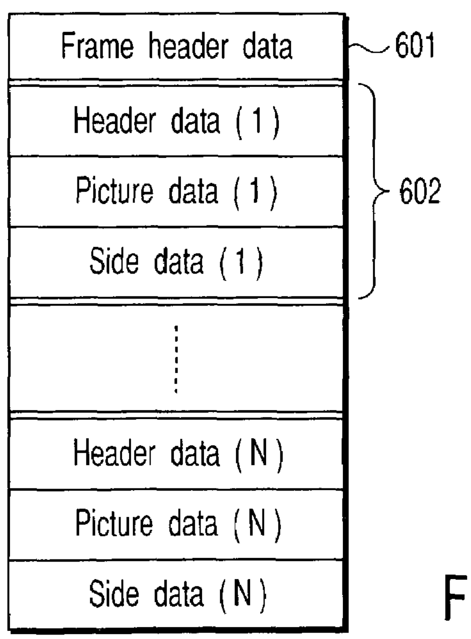
FIG. 6 is a view showing an example of the data structure of video data corresponding to a plurality of formats in the second embodiment.

FIG. 6 shows an example of the video data in the plurality of formats obtained in step S52 of conversion into the video data in the plurality of formats. Video data 602 each constructed by header data, picture data, and side data of the same frame, are arranged by the number of second encoded video data formats in time sequence following frame header data 601. The frame header data 601 at the head of the video data contains the number of header data 602, their positions, and the like.

Each of video data in the plurality of formats obtained in video data conversion step S52 is encoded into a bit stream in the corresponding second encoded video data format (step S53). More specifically, in encoding step S53, processing for generating a bit stream by encoding the header data 602 contained in the video data in the plurality of formats is repeated by the number of times corresponding to the number of header data 602. The bit streams in the plurality of second encoded video data formats obtained in encoding step S53 are independently stored in different converted video data storage devices.

If frame skipping is done in decoding step S51 or video data conversion step S52, there is no subsequent processing. If it is required to view an encoded preview, encoded video data is output concurrently with encoding.

As in the first embodiment, every time decoding, video data conversion processing, and encoding in steps S51, S52, and S53 are completed by one frame or a plurality of frames, the processing parameters in steps S51 to S53 are changed in accordance with an instruction from the user, monitoring results on processing quantities (processing speeds), or channel information (transmission speed, packet loss rate, and the like) (step S54), as described above.

The above processing is performed until it is determined in step S55 that the frame to be processed is the last frame. When the last frame is completely processed, the series of operations is terminated.

As described above, according to this embodiment, a bit stream in the first encoded video data format can be converted into bit streams in a plurality of second encoded video data formats.

In addition, in this embodiment, the first encoded video data is decoded only once, and the format conversion video data obtained by this decoding is converted into a plurality of video data in accordance with a plurality of second encoded video data formats. Thereafter, the bit stream is converted into bit streams in the respective second encoded video data formats. Therefore, the processing quantity and processing time are reduced as compared with the method of performing all the processes, i.e., decoding, video data conversion, and encoding, by the number of times corresponding to the number of second encoded video data formats.

In addition, in this embodiment, one video data converter 402 and one encoder 403 respectively perform video data conversion and decoding in accordance with a plurality of second encoded video data formats in time sequence. For this reason, when these processes are to be implemented by hardware, the hardware arrangement can be simplified. The embodiment is therefore effective for a small-scale system or format conversion processing that does not require a relatively high processing speed.

(Third Embodiment)

FIG. 7 shows the arrangement of a format conversion apparatus for encoded video data according to the third embodiment of the present invention. Like the second embodiment, this embodiment relates to a format conversion apparatus for converting a bit stream in one first encoded video data format into bit streams in a plurality of second encoded video data formats. An original video data storage device 700, a decoder 701, converted video data storage devices 705 prepared in correspondence with the plurality of second encoded video data formats, and an input device 708 are the same as those in the second embodiment.

This embodiment differs from the second embodiment in that pluralities of video data converters 702 and encoders 703 are prepared in correspondence with the plurality of second encoded video data formats. In this case, one of the video data converters 702 and one of the encoders 703 take charge of format conversion to the second encoded video data format.

More specifically, the plurality of video data converters 702 convert the conversion video data output from the decoder 701 into video data corresponding to the second encoded video data formats in their charge. The video data converted by each video data converter 702 is sent to the corresponding encoder 703 to be converted into a bit stream in the corresponding second encoded video data format. The bit stream is then stored in the corresponding converted video data storage device 705.

A processing parameter controller 704 has the same function as that in the first embodiment, but controls the processing parameters for each video data contained in the video data in a plurality of formats because the plurality of video data converters 702 and the plurality of encoders 703 process the video data in the plurality of formats.

According to this embodiment, as in the second embodiment, a bit stream in the first encoded video data format can be converted into bit streams in the plurality of second encoded video data formats.

In addition, in this embodiment, since the pluralities of video data converters 702 and encoders 703 are arranged in correspondence with the plurality of second encoded video data formats, the processing speed further increases as compared with the second embodiment. In addition, these video data converters 702 and encoders 703 can be distributed, and hence the embodiment is effective for conversion to many second encoded video data formats and a large-scale system.

(Fourth Embodiment)

A method of editing only a portion of a plurality of original videos which should be format-converted and format-converting the edited portion will be described next as the fourth embodiment of the present invention.

Figure 8:
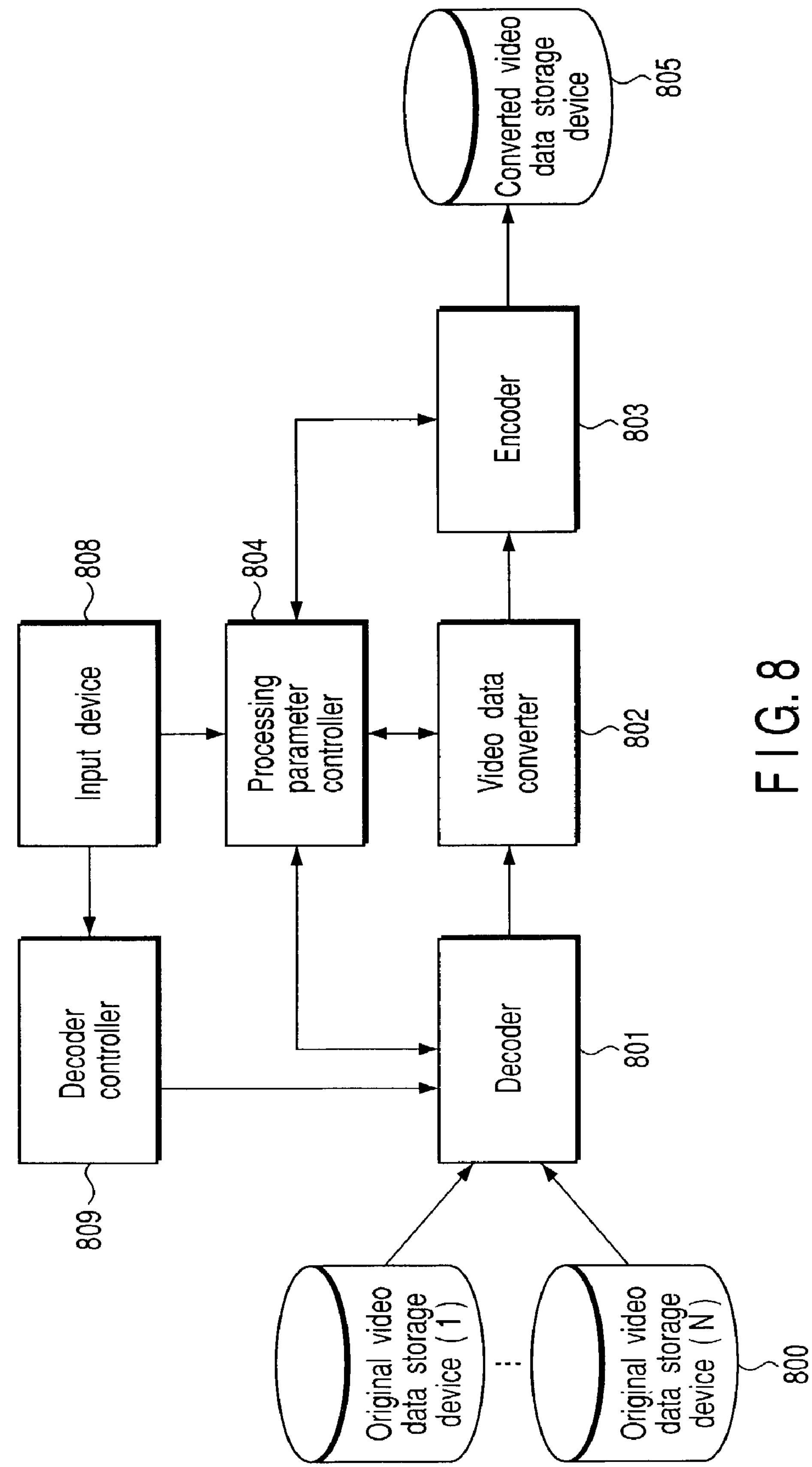
FIG. 8 is a block diagram showing the arrangement of an apparatus for converting the format of encoded video data according to the fourth embodiment of the present invention.

FIG. 8 is a block diagram showing the arrangement of a format conversion apparatus for encoded video data according to this embodiment. In this embodiment, bit streams in a plurality of first encoded video data formats which are output from a plurality of original video data storage devices 800 are input to a decoder 801. A decoder controller 809 is added to this embodiment. A video data converter 802, encoder 803, processing parameter controller 804, converted video data storage device 805, and input device 808 are the same as those in the first embodiment.

A decoder controller 809 gives the decoder 801 decoding position data indicating the time positions of portions, of the bit streams in the first encoded video data formats which are the plurality of original video data input from the original video data storage devices 800, which should be decoded by the decoder 801, and the decoding order of the portions to be decoded. In other words, decoding position data is data for designating specific portions of specific videos of a plurality of original videos which are to be decoded and format-converted and a specific decoding order of the specific portions. This decoding position data is input through the input device 808 before processing in accordance with an instruction from the user, but can be properly changed during processing.

If some kind of meta data representing the contents of a video is added to each bit stream in the first encoded video data format, such meta data may be used to determine specific portions of specific videos which are to be decoded and a specific decoding order. If, for example, meta data contains information indicating breaks between scenes and the degrees of importance of the respective scenes, a scene with a high degree of importance can be automatically extracted and format-converted. Alternatively, format conversion positions and a conversion order may be determined by using both meta data and an instruction from the user.

The decoder 801 reads out and decodes bit streams at the time positions designated by decoding position data from the decoder controller 809 from the original video data storage device 800 in the order designated by the decoding position data, and outputs format conversion video data. The format conversion video data are sequentially sent to the video data converter 802 to be converted into video data in a form suitable for the second encoded video data format. The subsequent processing is the same as that in the first embodiment.

Figure 9:
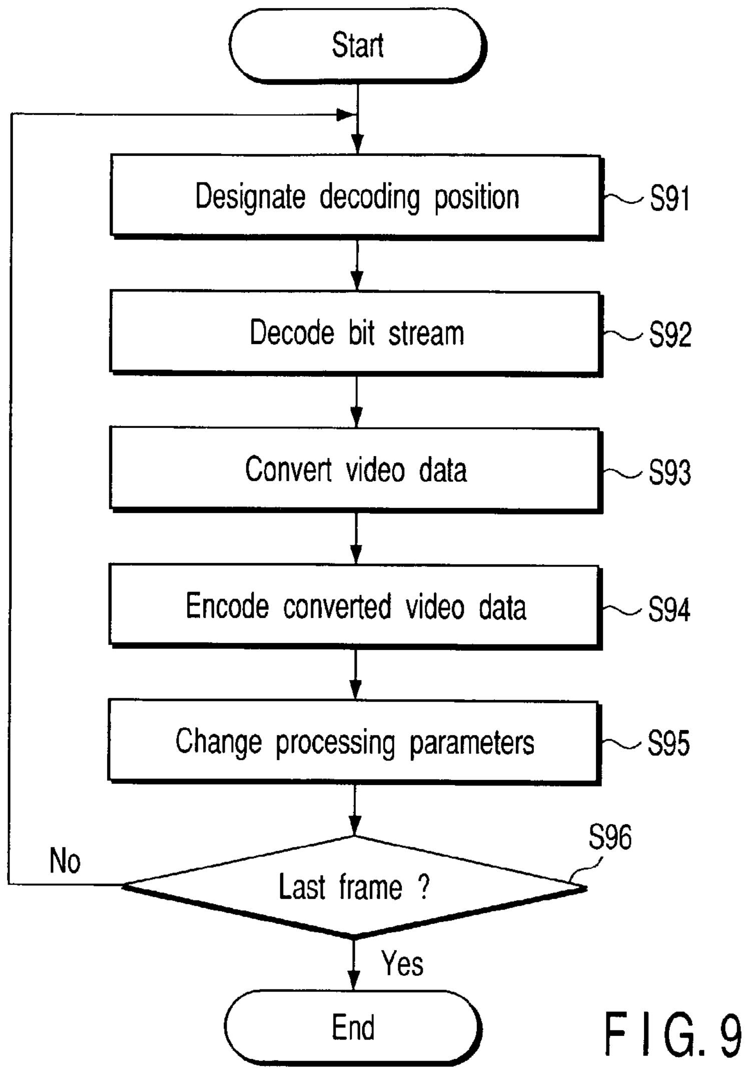
FIG. 9 is a flow chart showing a procedure in the fourth embodiment.

FIG. 9 shows the flow of processing in this embodiment. In this embodiment, decoding position designation step S91 is added to the processing in the first embodiment. Format conversion processing is performed for each frame. First of all, in step S91, a specific frame of a specific video which is to be processed next is designated by using decoding position data. The frame of the video is then decoded to obtain format conversion video data (step S92). Subsequently, in steps S93 to S95, the format conversion video data is converted and encoded to perform format conversion processing. These operations are the same as those in steps S22 to S24 in FIG. 2. The above processing is performed until it is determined in step S96 that the frame to be processed is the final frame. When the final frame is completely processed, the series of operations is terminated.

Figure 10:
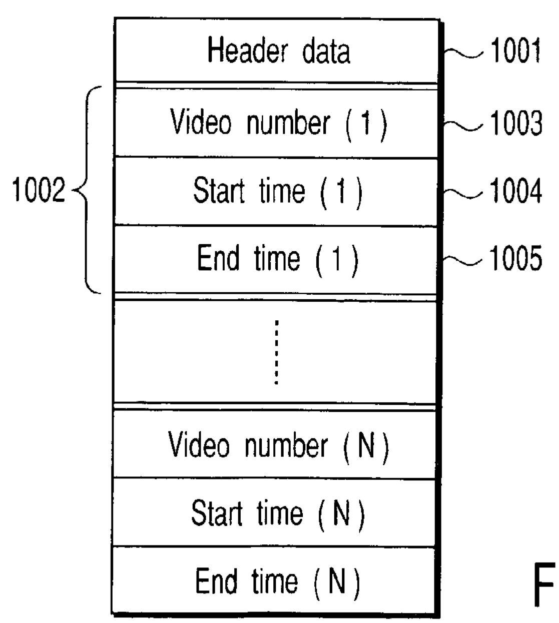
FIG. 10 is a view showing an example of the data structure processing position/time data in the fourth embodiment.

FIG. 10 shows an arrangement of decoding position data used in this embodiment. Decoding position data is constructed by one header data 1001 and one or more position data 1002. The header data 1001 is used to hold information such as the number of position data 1002. The position data 1002 has a video number 1003, start time 1004, and end time 1005. The video number 1003 designate a specific one of a plurality of original videos which is to be decoded. The start time 1004 and end time 1005 designate a specific portion of the video which is to be decoded.

If there are a plurality of position data 1002, partial videos written in the position data 1002 are sequentially decoded and processed. That is, the decoding order of portions to be decoded is indicated by the order of a plurality of position data 1002 within the decoding position data.

As described above, according to this embodiment, partial videos whose time positions are written in decoding position data are format-converted in the order written in the decoding position data, thereby converting the partial videos into one video. There is no need to edit the video data before or after format conversion processing, and only portions of a plurality of videos which are desired by the user can be edited and efficiently format-converted. That is, editing such as partial extraction and partial erasing operation for generating a digest and eliminating unnecessary portions of videos and merging only desired portions can be done simultaneously with format conversion, thereby improving the efficiency of editing and format conversion.

(Fifth Embodiment)

A encoded video data format conversion method of format-converting a video or encoded video data into another encoded video data by using meta data attached to the video will be described as the fifth embodiment of the present invention.

Figure 11:
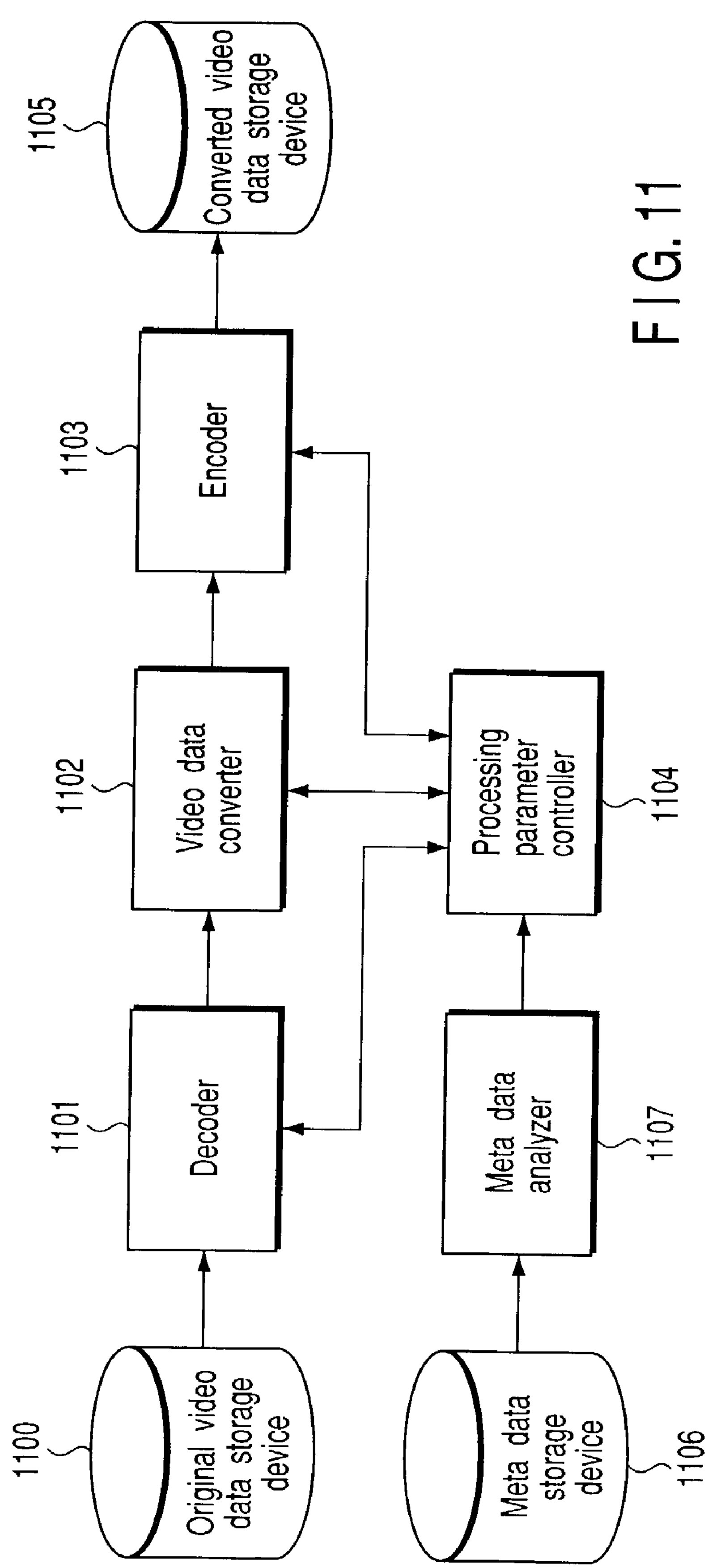
FIG. 11 is a block diagram showing the arrangement of an apparatus for converting the format of encoded video data according to the fifth embodiment of the present invention.

FIG. 11 shows an arrangement for a method of converting the format of a video or encoded video data according to this embodiment of the present invention. As shown in FIG. 11, this format conversion method includes an original video data storage device 1100, meta data storage device 1106, decoder 1101, video data converter 1102, encoder 1103, meta data analyzer 1107, processing parameter controller 1104, and converted video data storage device 1105.

The original video data storage device 1100 serves to acquire a video or encoded video data as a source data for format conversion, and is formed from, for example, a hard disk, optical disk, or semiconductor memory in which a video or encoded video data is stored. For example, when directly format-converting the video acquired by a video camera or encoded video data received by streaming distribution, the original video data storage device 1100 may be a video distribution server connected to the camera or network.

The meta data storage device 1106 serves to acquire meta data such as information corresponding to the video stored in the original video data storage device 1100 or encoded video data and user information, and is formed from, for example, a hard disk, optical disk, or semiconductor memory in which meta data is stored. If meta data is directly obtained from an external sensor or meta data generator, the meta data storage device 1106 becomes the external sensor or meta data generator. If meta data is obtained by streaming distribution together with encoded video data, the meta data storage device 1106 serves as a meta data distribution server connected to a network.

The decoder 1101 reads out a video obtained from the original video data storage device 1100 or encoded video data, decodes the data if it is encoded, and outputs the video data and speech data of each frame. In this case, the decoder 1101 may output side data in addition to the video data and speech data. The side data is auxiliary data obtained from the video or encoded video data, and can have, for example, a frame number, motion vector information, and a signal that can discriminate I, P, and B pictures from each other. Video data is generally equal in size to original video. When the video data is to be output, however, its size may be changed, or only the DC component of the video data may be output. Likewise, the data amount of side data may be reduced by skipping. These operations are controlled on the basis of control data from the processing parameter controller 1104. The operation of outputting the video data, speech data, and side data of a specific portion of a video or encoded video data from the decoder 1101 is controlled on the basis of control data from the processing parameter controller 1104.

The video data converter 1102 receives the video data sent from the decoder 1101, converts it into video data corresponding to a video format into which the data is to be converted, and outputs the resultant data to the encoder 1103. The video data converter 1102 outputs only necessary, sufficient frames to the encoder 1103 in accordance with the frame rate of the video to be converted. The frame rate may be either a constant frame rate or a variable frame rate. In the case of the constant frame rate, the video data converter 1102 controls the output frame rate on the basis of control data from the processing parameter controller 1104. In addition, the video data converter 1102 performs processing associated with the position data of a picture, e.g., changing the resolution of the picture or cutting or enlarging a portion of the picture, and filtering processing of generating a mosaic pattern on all or part of the picture, deliberately blurring the portion, or changing the color of the portion on the basis of control data from the processing parameter controller 1104.

The encoder 1103 encodes the video data sent from the video data converter 1102 into an encoded video data format into which the data is to be converted. Internal processing such as selection of encoding parameters, e.g., a bit rate at the time of encoding, and a quantization table and assignment of I, P, and B pictures is controlled on the basis of control data from the processing parameter controller 1104. The encoded data is stored in the converted video data storage device 1105 after format conversion. The meta data analyzer 1107 reads and analyzes the meta data obtained from the meta data storage device 1106 and outputs a picture characteristic quantity, speech characteristic quantity, semantic characteristic quantity, content related information, and user information to the processing parameter controller 1104.

The processing parameter controller 1104 receives the picture characteristic quantity, speech characteristic quantity, semantic characteristic quantity, content related information, and user information and controls the processing parameters in the decoder 1101, video data converter 1102, and encoder 1103 in accordance with these pieces of information.

The converted video data storage device 1105 serves to output encoded video data after format conversion, and is formed from, for example, a hard disk, optical disk, or semiconductor memory when storing the encoded video data. When encoded video data after format conversion is subjected to direct streaming distribution, the converted video data storage device 1105 is installed in a client terminal connected to a network. Note that the original video data storage device 1100, meta data storage device 1106, and converted video data storage device 1105 may be formed from a single device or different devices.

Figure 12:
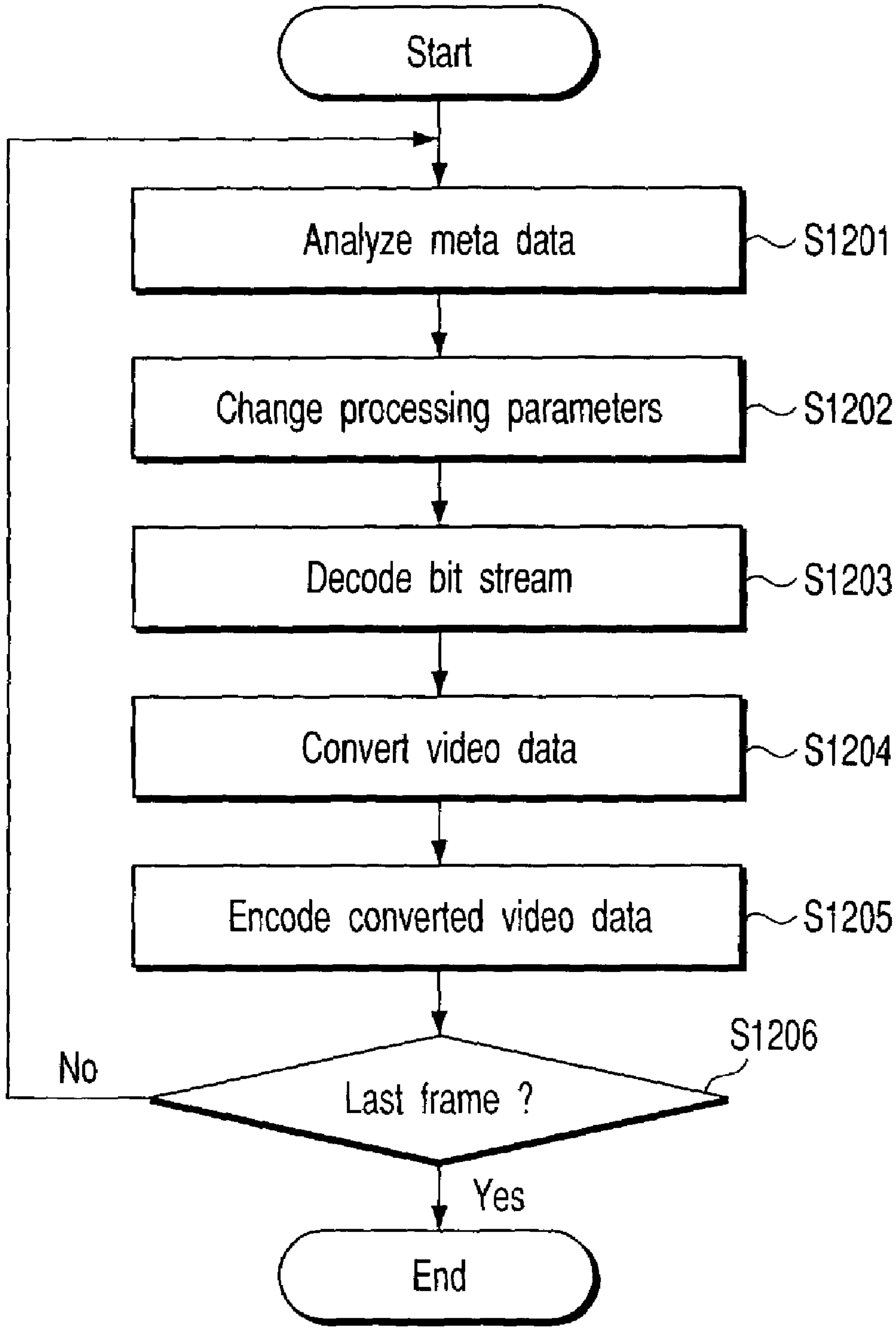
FIG. 12 is a flow chart showing a procedure in the fifth embodiment.

FIG. 12 is a flow chart showing an example of the flow of processing in this embodiment.

In this embodiment, processing is performed frame by frame. In meta data analyzing step S1201, meta data is analyzed. In processing parameters changing step S1202, the processing parameters in format conversion are changed in accordance with the analysis result in meta data analyzing step S1201. If there is no need to analyze the meta data or change the processing parameters, meta data analyzing step S1201 or processing parameters changing step S1202 are skipped. In decoding step S1203, 1-frame video data is decoded. In video data conversion step S1204, the format of the video data is converted. In encoding step S1205, the video data is encoded into a bit stream. In this case, if the frame is skipped in decoding processing or video data conversion processing, no further processing is done. The above processing is performed up to the final frame. When the final frame is completely processed, the series of operations is terminated. In this case, the meta data may be data corresponding to each frame of a picture, data corresponding to the overall video sequence, or data corresponding to a given spatial temporal region. For this reason, in meta data analyzing step S1201, the entire meta data or meta data corresponding to a preceding frame is analyzed before a video is input, as needed.

Figure 13:
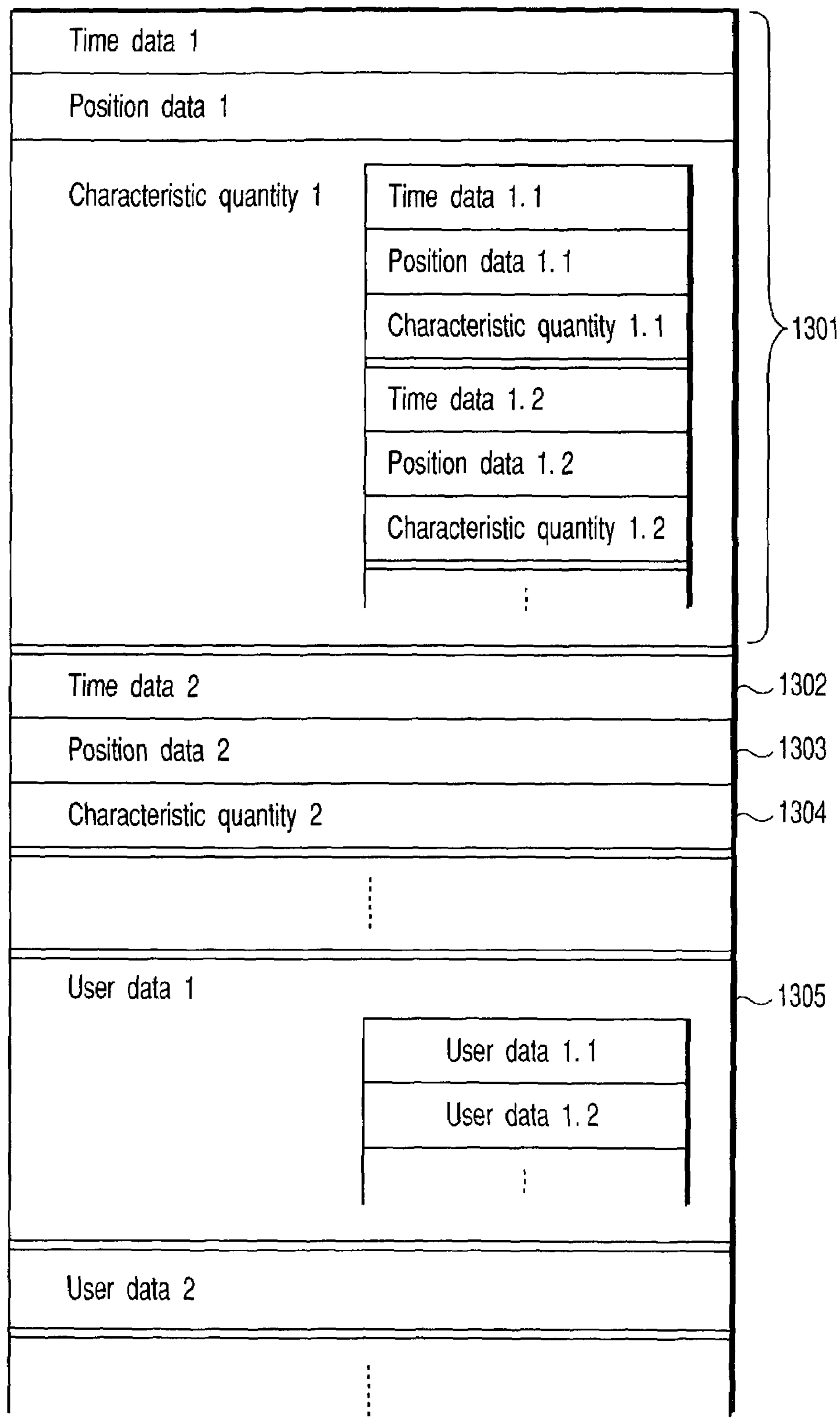
FIG. 13 is a view showing the data structure of meta data in the fifth embodiment.

FIG. 13 shows an example of the data structure of meta data. Meta data is formed from an array of at least one each of a descriptor 1301 including a set of time data 1302, position data 1303, and characteristic quantity 1304, and user data 1305. The descriptor 1301 and user data 1305 may be arranged in an arbitrary order or stored in different files. In addition, pluralities of descriptors 1301 and user data 1305 may be described as subsidiary elements of the descriptor 1301 and user data 1305 and managed in the form of a tree structure.

A part or all of a video or a bit stream in a encoded video data format is designated by the time data 1302 and position data 1303. As the time data 1302, a time stamp or the like is often used. However, this data may be a frame count, byte position, or the like. As the position data 1303, a bounding box, polygon, alpha map, or the like is often used. However, any data that can indicate a spatial position can be used. In order to express complicated time data and position data like the position of an object that moves over a plurality of frames, a data format like an integration of the time data 1302 and position data 1303 may be used. For example, a data format such as Spatio Temporal Locator in the MPEG-7 specifications can be used. According to Spatio Temporal Locator, the shape of each frame is approximated to a rectangle, ellipse, or polygon, and the locus of characteristic quantity in the temporal direction such as the coordinates of a vertex of an approximate shape is spline-approximated. If information about time and information about position are not required, the time data 1302 and position data 1303 can be omitted.

The characteristic quantity 1304 represents what characteristics the spatial temporal region designated by the time data 1302 and position data 1303 has. This data describes picture characteristic quantity such as color, motion, texture, cut, special effects, the position of an object, and character data, speech characteristic quantity such as sound volume, frequency spectrum, waveform, speech contents, and tone, semantic characteristic quantity such as location, time, person, feeling, event, and importance, and content related information such as segment data, comment, media information, right information, and usage.

The user data 1305 describes the individual information of each user. This data can arbitrarily describe individual data such as an ID, name, and preference that discriminate each user, equipment data such as the equipment used and the network used, and user data such as an application purpose, money data, and log in accordance with the purpose.

In conventional picture encoding processing without any meta data, selection of many encoding modes and setting of many parameters which are required for encoding are automatically determined and performed on the basis of an input picture or manually performed on the basis of experience. By using or applying the various kinds of information described in meta data in this embodiment, more accurate automatic setting can be done, automatization of manual setting operation can be realized, and the processing efficiency in automatic setting can be improved. Meta data can take any format as long as a picture characteristic quantity, speech characteristic quantity, semantic characteristic quantity, content related information, and user information can be stored and read. For example, a data format complying with MPEG-7 which is a domestic standard is often used.

Specific methods of controlling the processing parameters in processing content changing step S1202 using meta data will be enumerated. When color information such as a color histogram, main color, hue, and contrast in a given spatial temporal region is described in meta data, the color information can be used for bit assignment control in encoding operation, motion detection, preprocessing filtering in the video data converter, or the like. When this information is used for bit assignment control, control can be done such that many bits are assigned to a portion whose color is considered important, e.g., a human skin color, to sharpen the portion, or the number of bits assigned to a portion which is difficult to discriminate because of low contrast is decreased. Consider the use of the data for motion detection. In general, motion detection is often performed by using only luminance planes. When, however, there is little luminance change on a frame, motion detection may be performed with higher precision by using hue information or another color space information. In such a case, the color information of the meta data can be used. When preprocessing filtering is to be performed, an optical filter can be selected in accordance with color characteristics.

If texture information such as the strength, granularity, directivity, or edge characteristic of a texture in a given spatial temporal region is described in meta data, the texture data can be used for filter control in video data conversion, selection of a quantization table in encoding operation, motion detection, or the like. When a quantization table is to be selected, quantization errors can be suppressed by using a quantization table suitable for the distribution characteristic and granularity of the texture, thereby realizing efficient quantization. When the directivity and range of the texture are known, motion detecting operation can be controlled such that, for example, motion detection in a certain direction or range can be omitted or a search direction is set. When the data is used for filter control, for example, an improvement in picture quality can be attained by using a filter suitable for directivity or granularity in accordance with the directivity, strength, granularity, range, and the like of the texture.

When motion data such as the speed, magnitude, and direction of the motion of a picture in a given spatial temporal region is described in meta data, the motion data can be used for filter control in video data conversion, frame rate control, resolution control, selection of a quantization table in encoding operation, motion detection, bit assignment, assignment of I, P, and B pictures, control on the M value corresponding to the frequency of insertion of P pictures, control on a frame/field structure, frame/field DCT switching control, and the like. For example, an appropriate frame rate can be set in accordance with the speed of the motion, or the precision or search range of motion detection or search method can be changed. An improvement in picture quality can be attained by setting a high frame rate in a region with a high speed of motion or inserting many I pictures therein. By using information about the direction and magnitude of motion in motion detection, the precision and speed of motion detection can be increased. An improvement in encoding efficiency can be attained by selecting encoding with a field structure and field DCT in a temporal region with a high speed of motion and selecting encoding with a frame structure and frame DCT in a temporal region with a small motion. An optimal preprocessing filter characteristic can be selected in accordance with the motion data described in the meta data. Optimal visual characteristic encoding within a limited bit rate can be realized by controlling the balance between the frame rate and a decrease in resolution due to the preprocessing filter in accordance with this meta data.

When object information indicating whether a given spatial temporal region is an object such as a person or vehicle or a background, its motion, characteristics, and the like is described in the meta data, the object information can be used for control on temporal range designation in decoding operation, filter control in video data conversion, frame rate control, resolution control, motion detection in encoding operation, and bit assignment, setting of an object in object encoding, and the like. For example, a digest associated with a specific object can be generated by processing data only in time intervals in which the specific object exists, and the object can be enlarged and encoded by cutting only the peripheral portion of a place where the object exists. In addition, the data amount of a background region can be reduced by blurring or darkening a background portion or decreasing its contrast. This makes it possible to improve the picture quality of the object portion by increasing the number of bits assigned to the object region. Efficient motion detection can be realized by controlling a motion vector search range on the basis of the information of an object region or background region. In object encoding based on MPEG-4 or the like, the encoding efficiency can be improved by using meta data for object control.

When editing information such as a cut, camera motion, and special effects, e.g., a wipe, within a given temporal range is described in meta data, the editing information can be used for filter control in video data conversion, frame rate control, motion detection in encoding operation, assignment of I, P, and B pictures, M value control, and the like. For example, I pictures can be inserted or a time direction filter can be controlled in cutting operation. The precision and speed of motion detection can also be increased from camera motion information. In addition, an improvement in picture quality can be improved by using filters in accordance with special effects such as a wipe and dissolve.

When character data depicted in a video, e.g., telop character or signboard information, in a given spatial temporal region is described in meta data, the character data can be used for control on temporal range designation in decoding operation, filter control in video data conversion, frame rate control, resolution control, and bit assignment control in encoding operation, and the like. For example, a digest video can be generated by format-converting only portions where a specific telop is displayed, or a telop portion is made easier to see or character thickening can be reduced by enlarging only a telop range, filtering it, or assigning more bits to it.

When speech data such as a sound volume, speech waveform, speech frequency distribution, tone, speech contents, and melody within a given temporal range is described in meta data, the speech data can be used for control on temporal range designation in decoding operation, filter control in video data conversion, bit assignment in encoding operation, and the like. For example, a pause portion or melody portion is extracted and format-converted, or a special effect filter can be applied to a video in accordance with the tone. The importance of video data can be estimated from speech data, and the picture quality can be controlled in accordance with the estimation. In addition, optimal multimedia encoding can be done by controlling the ratio of the code amount of speech data to that of video data.

When semantic data such as a location, time, person, feeling, event, and importance in a given spatial temporal region is described in meta data, the semantic data can be used for control on temporal range designation in decoding operation, filter control in video data conversion, frame rate control, resolution control, bit assignment in encoding operation, and the like. For example, a format conversion range can be controlled on the basis of feeling data, importance, and person data, and picture quality can be controlled in accordance with the importance by controlling bit assignment, frame rate, and resolution, thereby controlling overall code amount distribution.

When content related information such as segment data, comment, media information, right information, and usage in a given spatial temporal region is described in meta data, the content related information can be used for control on temporal range designation in decoding operation, filter control in video data conversion, frame rate control, resolution control, bit assignment in encoding operation, and the like. For example, only a given segment data portion can format-converted, or resolution or filtering control can be done on the basis of right information. For example, this meta data makes it possible to encode video data into data having picture quality equal to that of the original video for a user who has the right to view and to perform encoding upon decreasing the frame rate, resolution, or picture quality for a user whose right is limited.

When user data such as equipment used for a bit stream after format conversion, application purpose, user, money data, and log is described in meta data, the user data can be used for control on temporal range designation in decoding operation, filter control in video data conversion, frame rate control, resolution control, bit assignment in encoding operation, and the like. For example, the resolution can be increased/decreased in accordance with the equipment to be used or a portion of a video can be cut in accordance with the equipment to be used. In addition, the bit rate can be controlled in accordance with a network through which streaming distribution is performed. Furthermore, filtering can be done or the bit rate can be changed on the basis of the money data of the user.

The above control operations for changing processing parameters may be done alone or in combination. For example, if the resolution of equipment used is low, only a portion around an object is cut and format-converted by using object data and user data. In addition, an MPEG-4 sprite can be generated from camera motion data and object data and format-converted.

According to this embodiment, when a given video or a bit stream in a encoded video data format is to be converted into a bit stream in another encoded video data format, the processing parameters can be changed by referring to attached meta data. This makes it possible to automatically perform fine processing control, e.g., format-converting an important scene or object with higher precision, performing format conversion suitable for quick motion with respect to a scene or object which moves at high speed, and performing format conversion in accordance with the equipment that uses a bit stream after format conversion, the network, or the compensation.

As has been described above, according to the present invention, processing parameters can be changed in accordance with an instruction from a user or information about a transmission channel during format conversion of converting a bit stream in a given encoded video data format into a bit stream in another encoded video data format.

In addition, according to the present invention, a bit stream in one encoded video data format can be efficiently converted into bit streams in a plurality of encoded video data formats.

Furthermore, according to the present invention, only a portion of a bit stream in the first encoded video data format, of one or a plurality of original videos, which is to be converted can be edited and efficiently format-converted into a bit stream in the second encoded video data format.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A format conversion method for converting a bit stream of a first encoded video data format to a bit stream of a second encoded video data format, the method comprising:

decoding selectively the bit stream of the first encoded video data format to generate decoded video data;

converting the decoded video data to the second encoded video data format to generate converted video data;

encoding the converted video data in a process for converting the bit stream of the first encoded video data format to the bit stream of the second encoded video data format, to generate the bit stream of the second encoded video data format; and controlling processing parameters of at least one of the decoding, the converting and the encoding in accordance with information concerning a transmission channel through which the bit stream of the second encoded video data format is transmitted.

2. A format conversion method for converting a bit stream of a first encoded video data format to a bit stream of a second encoded video format, the method comprising:

decoding selectively the bit stream of the first encoded video data format to generate decoded video data;

converting the decoded video data to the second encoded video data format to generate converted video data;

encoding the converted video data in a process for converting the bit stream of the first encoded video data format to the bit stream of the second encoded video data format, to generate the bit stream of the second encoded video data format; and controlling processing parameters of at least one of the decoding, the converting and the encoding, wherein decoding the bit stream includes decoding bit streams of one or more first encoded video data formats, and controlling the processing parameters includes controlling a time position and a decoding order of parts of the bit streams to be decoded in the decoding, according to designation from a user or meta data added to the first video coded data.

3. A format conversion method for converting a bit stream of a first encoded video data format to a bit stream of a second encoded video data format, the method comprising:

decoding selectively the bit stream of the first encoded video data format to generate decoded video data;

converting the decoded video data to a format suitable for the second encoded video data format to generate converted video data;

encoding the converted video data to generate the bit stream of the second encoded video data format; and controlling processing parameters of at least one of the decoding, the converting and the encoding in a process of converting the first encoded video data format to the second encoded video data format, using meta data accompanying the bit stream of the first encoded video data format and including data concerning user information indicating a user using a result of the encoding.

4. A format conversion apparatus which converts a bit stream of a first encoded video data format to a bit stream of a second encoded video data format, the apparatus comprising:

a decoder configured to decode selectively the bit stream of the first encoded video data format to output decoded video data according to its processing parameters;

a converter which converts the decoded video data to the second encoded video data format to output converted video data according to its processing parameters;

an encoder configured to encode the converted video data to output the bit stream of the second encoded video data format according to its processing parameters; and a controller configured to control the processing parameters of at least one of the decoder, the converter, and the encoder in converting the video data, wherein the converter is configured to convert the video data to plural second encoded video data formats and output converted video data, and the encoder is configured to encode the converted video data and output the bit streams of the plural second encoded video data formats.

5. A format conversion apparatus which converts a bit stream of a first encoded video data format to a bit stream of a second encoded video data format, the apparatus comprising:

a decoder configured to decode selectively the bit stream of the first encoded video data format to output decoded video data according to its processing parameters;

a converter which converts the decoded video data to the second encoded video data format to output converted video data according to its processing parameters;

an encoder configured to encode the converted video data to output the bit stream of the second encoded video data format according to its processing parameters; and a controller configured to control the processing parameters of at least one of the decoder, the converter and the encoder in converting the video data.

wherein the decoder decodes the bit streams of one or more first encoded video data formats and output video data, the converter includes a plurality of converter units provided in correspondence with plural second encoded video data formats and configured to convert the converted video data to the second encoded video data formats and output converted video data, and the encoder includes a plurality of encoder units provided in correspondence with the plural second encoded video data formats and configured to encode the converted video data and output bit streams of the second encoded video data formats.

6. A format conversion apparatus which converts a bit stream of a first encoded video data format to a bit stream of a second encoded video data format, the apparatus comprising:

a decoder which decodes selectively the bit stream of the first encoded video data format and outputs decoded video data;

a controller which controls a time position and a decoding order of parts of the bit streams to be decoded by the decoder in accordance with designation of a user or meta data added to the first video coded data;

a converter which converts the decoded video data to the second encoded video data format and outputs converted video data; and an encoder which encodes the converted video data and outputs the bit stream of the second encoded video data format.

7. A format conversion apparatus according to claim 6, which includes a processing parameter controller which controls processing parameters of at least one of the decoder, the converter and the encoder in converting the video data to the second encoded video data format.

8. A format conversion apparatus according to claim 6, wherein the decoder outputs decoded video data used for viewing an original image of the bit stream of the first encoded video data format as well as the video data.

9. A format conversion apparatus according to claim 6, wherein the encoder outputs encoded video data used for a preview as well as the bit stream of the second encoded video data format.

10. A format conversion program recorded on a computer readable medium and making a computer convert a bit stream of a first encoded video data format to a bit stream of a second encoded video data format, the program comprising:

means for instructing the computer to decode selectively the bit stream of the first encoded video data format to generate decoded video data;

means for instructing the computer to convert the decoded video data to a format suitable for the second encoded video data format to generate converted video data;

means for instructing the computer to encode the converted video data to generate the bit stream of the second encoded video data format;

means for instructing the computer to convert the bit stream of the first encoded video data format to the bit stream of the second encoded video data format;

means for instructing the computer to control processing parameters of at least one of decoding, converting and encoding;

means for instructing the computer to convert the video data to plural second encoded video data formats to generate plural converted video data; and means for instructing the computer to encode the plural converted video data to generate bit streams of the plural second encoded video data formats.

11. A format conversion program recorded on a computer readable medium and making a computer convert a bit stream of a first encoded video data format to a bit stream of a second encoded video data format, the program comprising:

means for instructing the computer to decode selectively the bit stream of the first encoded video data format to generate decoded video data;

means for instructing the computer to convert the decoded video data to a format suitable for the second encoded video data format to generate converted video data;

means for instructing the computer to encode the converted video data to generate the bit stream of the second encoded video data format;

means for instructing the computer to convert the bit stream of the first encoded video data format to the bit stream of the second encoded video data format:

means for instructing the computer to control processing parameters of at least one of decoding, converting and encoding;

means for instructing the computer to decode bit streams of one or more first encoded video data formats to generate video data; and means for instructing the computer to control a time position and a decoding order of parts of the bit streams to be decoded in the decoding by designation from a user or meta data added to the first video coded data.

* * * * *